(12) United States Patent
Mumick et al.

(10) Patent No.: US 6,484,159 B1
(45) Date of Patent: Nov. 19, 2002

(54) METHOD AND SYSTEM FOR INCREMENTAL DATABASE MAINTENANCE

(75) Inventors: Inderpal Singh Mumick, Berkeley Heights, NJ (US); Himanshu Gupta, Mountain View, CA (US)

(73) Assignees: AT&T Corp., New York, NY (US); Savera Systems, Inc., Murray Hill, NJ (US)

(*) Notice: Subject to any disclaimer, the term of this patent is extended or adjusted under 35 U.S.C. 154(b) by 0 days.

(21) Appl. No.: 09/315,161

(22) Filed: May 20, 1999

(51) Int. Cl.[7] .............................................. G06F 17/30
(52) U.S. Cl. .......................................... 707/2; 707/100
(58) Field of Search ........................... 707/1, 2, 4, 100, 707/101, 102

(56) References Cited

U.S. PATENT DOCUMENTS

| | | | | |
|---|---|---|---|---|
| 5,897,632 A | * | 4/1999 | Dar et al. ...................... | 707/2 |
| 5,991,754 A | * | 11/1999 | Raitto et al. ................... | 707/2 |
| 6,006,216 A | * | 12/1999 | Griffin et al. .................. | 707/2 |
| 6,026,390 A | * | 2/2000 | Ross et al. ..................... | 707/2 |
| 6,058,391 A | * | 5/2000 | Gardner ......................... | 707/4 |
| 6,058,401 A | * | 5/2000 | Stamos et al. ............... | 707/201 |
| 6,125,360 A | * | 9/2000 | Witkowski et al. ............ | 707/2 |

OTHER PUBLICATIONS

Segev et al. "Updating Distributed Materialized Views" IEEE Transaction on Knowledge and Data Engineering. vol. 1, No. 2 Jun. 1989, pp. 173–184.*

Quass et al. "Making Views Self–Maintainable for Data Warehousing" Parallel and Distributed Information Systems, 1996., Fourth International Conference on, 1996 pp.: 158–169.*

Mumick et al. "Maintenance of Data Cubes and Summary Tables in a Warehouse", SIGMOD, vol. 26, Issue 2, Jun. 1997, pp. 100–111.

Qian et al. "Incremental Recomputation of Active Relational Expressions", IEEE Transactions on Knowledge and Engineering, Sep. 1991, pp. 337–341.

Griffin et al. "Incremental Maintenance of Views with Duplications", SIGMOD, vol. 24, Issue 2, May 1995, pp. 328–339.

Quass "Materialized Views in Data Warehouse" Dissertation, Aug. 1997, pp. 1–215.

Zhuge "View Maintenance in a Warehousing Environment" SIGMOD, vol. 24, Issue 2, May 1995, pp. 316–327.

* cited by examiner

Primary Examiner—John Breene
Assistant Examiner—Khanh Pham

(57) ABSTRACT

The present invention is a method and system for incrementally maintaining a database having at least one materialized view based on at least one table. When changes to the table are received, a change table based on the received changes is generated. The generated change table is propagated upwards to form a higher-level change table and the materialized view is updated by applying the higher-level change table to the materialized view using a refresh operation. In one aspect, the change table includes a plurality of tuples representing the changes and the materialized view includes a plurality of tuples. The refresh operation has two parameters, a join condition and an update function specification. The materialized view is updated by finding all tuples in the materialized view that match the tuple in the change table, using the join condition, for each tuple in the change table and updating each found tuple in the materialized view by performing operations indicated by the update function specification.

24 Claims, 5 Drawing Sheets

FIG. 3

| 302 sales TABLE | | | |
|---|---|---|---|
| storeID | itemID | date | price |
| NY1 | I1 | 1/3/95 | 110 |
| NY2 | I2 | 7/3/95 | 200 |
| NY2 | I2 | 3/1/95 | 280 |
| SJ1 | I1 | 1/1/95 | 100 |

| 304 INSERTIONS INTO sales ($\Delta$sales) | | | |
|---|---|---|---|
| storeID | itemID | date | price |
| NY1 | I1 | 1/4/95 | 70 |
| NY1 | I1 | 1/5/95 | 50 |
| NY2 | I2 | 7/3/95 | 50 |
| NY3 | I3 | 1/1/95 | 100 |

| stores TABLE | | |
|---|---|---|
| storeID | city | state |
| NY1 | NEW YORK | NY |
| SJ1 | SAN JOSE | CA |
| NY3 | BUFFALO | NY |

| 305 item TABLE | | |
|---|---|---|
| itemID | category | cost |
| I1 | C1 | 50 |
| I1 | C2 | 50 |
| I2 | C3 | 80 |
| I2 | C1 | 80 |

| 306 SISales CHANGE TABLE ("$V_1$") | | | |
|---|---|---|---|
| storeID | itemID | SumSISales | NumSISales |
| NY1 | I1 | 120 | 2 |
| NY2 | I2 | 50 | 1 |

| 301 CategorySales ($V_3$) VIEW | | |
|---|---|---|
| category | SumCaSales | NumCaSales |
| C1 | 690 | 4 |
| C2 | 210 | 2 |
| C3 | 480 | 2 |

$\cup_\theta$

| 308 CategorySales CHANGE TABLE ("$V_3$") | | |
|---|---|---|
| category | SumCaSales | NumCaSales |
| C1 | 170 | 3 |
| C2 | 120 | 2 |
| C3 | 50 | 1 |

=

| 312 Refreshed CategorySales ($V_3$) VIEW | | |
|---|---|---|
| category | SumCaSales | NumCaSales |
| C1 | 860 | 7 |
| C2 | 330 | 4 |
| C3 | 530 | 3 |

FIG. 4

SSRecentInfo (V$_5$) View — 402

| storeID | itemID | date | price | st.storeID | st.city | st.state |
|---------|--------|------|-------|------------|---------|----------|
| NY1 | I1 | 1/3/95 | 110 | NY1 | NEW YORK | NY |
| NY2 | I2 | 7/3/95 | 200 | NULL | NULL | NULL |
| NY2 | I2 | 3/1/95 | 280 | NULL | NULL | NULL |
| SJ1 | I1 | 1/1/95 | 100 | SJ1 | SAN JOSE | CA |
| NULL | NULL | NULL | NULL | NY3 | BUFFALO | NY |

SSRecentInfo/SSInfo Change Table ("V$_5$ = $\sigma_{(date>1/1/95)}$("V$_4$)="V$_4$) — 404

| storeID | itemID | date | price | st.storeID | st.city | st.state |
|---------|--------|------|-------|------------|---------|----------|
| NY1 | I1 | 1/4/95 | 70 | NY1 | NEW YORK | NY |
| NY1 | I1 | 1/5/95 | 50 | NY1 | NEW YORK | NY |
| NY2 | I2 | 7/3/95 | 50 | NULL | NULL | NULL |
| NY3 | I3 | 1/1/95 | 100 | NY3 | BUFFALO | NY |

Refresh SSRecentInfo (V$_5$) View — 406

| storeID | itemID | date | price | st.storeID | st.city | st.state |
|---------|--------|------|-------|------------|---------|----------|
| NY1 | I1 | 1/3/95 | 110 | NY1 | NEW YORK | NY |
| NY2 | I2 | 7/3/95 | 200 | NULL | NULL | NULL |
| NY2 | I2 | 3/1/95 | 280 | NULL | NULL | NULL |
| SJ1 | I1 | 1/1/95 | 100 | SJ1 | SAN JOSE | CA |
| NY3 | I3 | 1/1/95 | 100 | NY3 | BUFFALO | NY |
| NY1 | I1 | 1/4/95 | 70 | NY1 | NEW YORK | NY |
| NY1 | I1 | 1/5/95 | 50 | NY1 | NEW YORK | NY |
| NY2 | I2 | 7/3/95 | 50 | NULL | NULL | NULL |

METHOD AND SYSTEM FOR INCREMENTAL DATABASE MAINTENANCE

FIELD OF THE INVENTION

The present invention relates to a method and system for incremental database maintenance, and in particular to updating materialized views in a database.

BACKGROUND OF THE INVENTION

In a data warehouse, views are computed and stored in the database to allow efficient querying and analysis of the data. These views stored at the data warehouse are known as materialized views. In order to keep the views in the data warehouse up to date, it is necessary to maintain the materialized views in response to the changes at the sources. The view can be either recomputed from scratch, or incrementally maintained by propagating the base data changes onto the view so that the view reflects the changes. Incrementally maintaining a view can be significantly cheaper than recomputing the view from scratch, especially if the size of the view is large compared to the size of the changes.

The problem of finding such changes at the views based on changes to the base relations has come to be known as the view maintenance problem and has been studied extensively. Traditional maintenance techniques propagate insertions and deletions from the base relations to the view through each of its operations. Several improved schemes have been proposed for incremental maintenance of view expressions. However, problems arise with traditional techniques and with prior improved schemes. For example, none of the previously known schemes efficiently handles the case of general view expressions involving aggregate and outerjoin operators. As another example, most of the incremental maintenance approaches compute and propagate insertions and deletions at each node in a view expression tree, which is often inefficient.

A need arises for an incremental maintenance technique which efficiently handles general view expressions involving aggregate and outerjoin operators.

SUMMARY OF THE INVENTION

The present invention is a method and system for incrementally maintaining a database having at least one materialized view based on at least one table. When changes to the table are received, a change table based on the received changes is generated. The generated change table is propagated upwards to form a higher-level change table and the materialized view is updated by applying the higher-level change table to the materialized view using a refresh operation.

In one aspect of the present invention, the change table includes a plurality of tuples representing the changes and the materialized view includes a plurality of tuples. The refresh operation has two parameters, a join condition and an update function specification. The materialized view is updated by finding all tuples in the materialized view that match the tuple in the change table, using the join condition, for each tuple in the change table and updating each found tuple in the materialized view by performing operations indicated by the update function specification.

In one embodiment of the present invention, the materialized view is an aggregated materialized view. In this embodiment, each tuple in the materialized view and in the change table includes at least one aggregated attribute and may include one or more non-aggregated attributes. Tuples in the materialized view that match the tuple in the change table are found, using the join condition, by matching the non-aggregated attribute of a tuple in the change table, if any, with the non-aggregated attribute of a tuple in the view. Each found tuple in the materialized view is updated by updating the aggregated attribute of the tuple in the view using the aggregated attribute of the tuple in the change table.

In one aspect of this embodiment, the materialized view is further updated by inserting a tuple from the change table into the materialized view, if no tuples are found in the materialized view that match the tuple from the change table, and deleting a tuple from the materialized view, if an aggregated attribute representing a count of a number of tuples in a group represented by a the tuple becomes zero.

In another embodiment of the present invention, the materialized view is an outerjoin materialized view based on a plurality of tables. In this embodiment, there is a tuple in the materialized view corresponding to each value of at least one selected attribute in any of the plurality of tables. Each tuple in the materialized view comprises at least one selected attribute and at least one other attribute. Tuples in the materialized view that match the tuple in the change table are found, using the join by matching the at least one selected attribute of a tuple in the change table with the at least one selected attribute of a tuple in the view. Each found tuple in the materialized view is updated by updating the at least one other attribute of the tuple in the view using the at least one other attribute of the tuple in the change table.

In one aspect of this embodiment, the materialized view is further updated by inserting a tuple from the change table into the materialized view, if no tuples are found in the materialized view that match the tuple from the change table and deleting a tuple from the materialized view, if a value of the at least one selected attribute of the tuple is no longer present in any table.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an example of the computation of change tables and the refreshing of a materialized view.

FIG. 4 is another example of the change tables and refreshing of a materialized view.

DETAILED DESCRIPTION OF THE INVENTION

The present invention uses a framework of change-tables and a refresh operator for incrementally maintaining general view expressions involving relational and aggregate operators. The developed framework easily extends to efficiently maintaining view expressions containing outerjoin operators. Moreover, the framework also yields an approach to allow propagation of certain kinds of deletions and updates directly in a very efficient manner.

Figure 1:
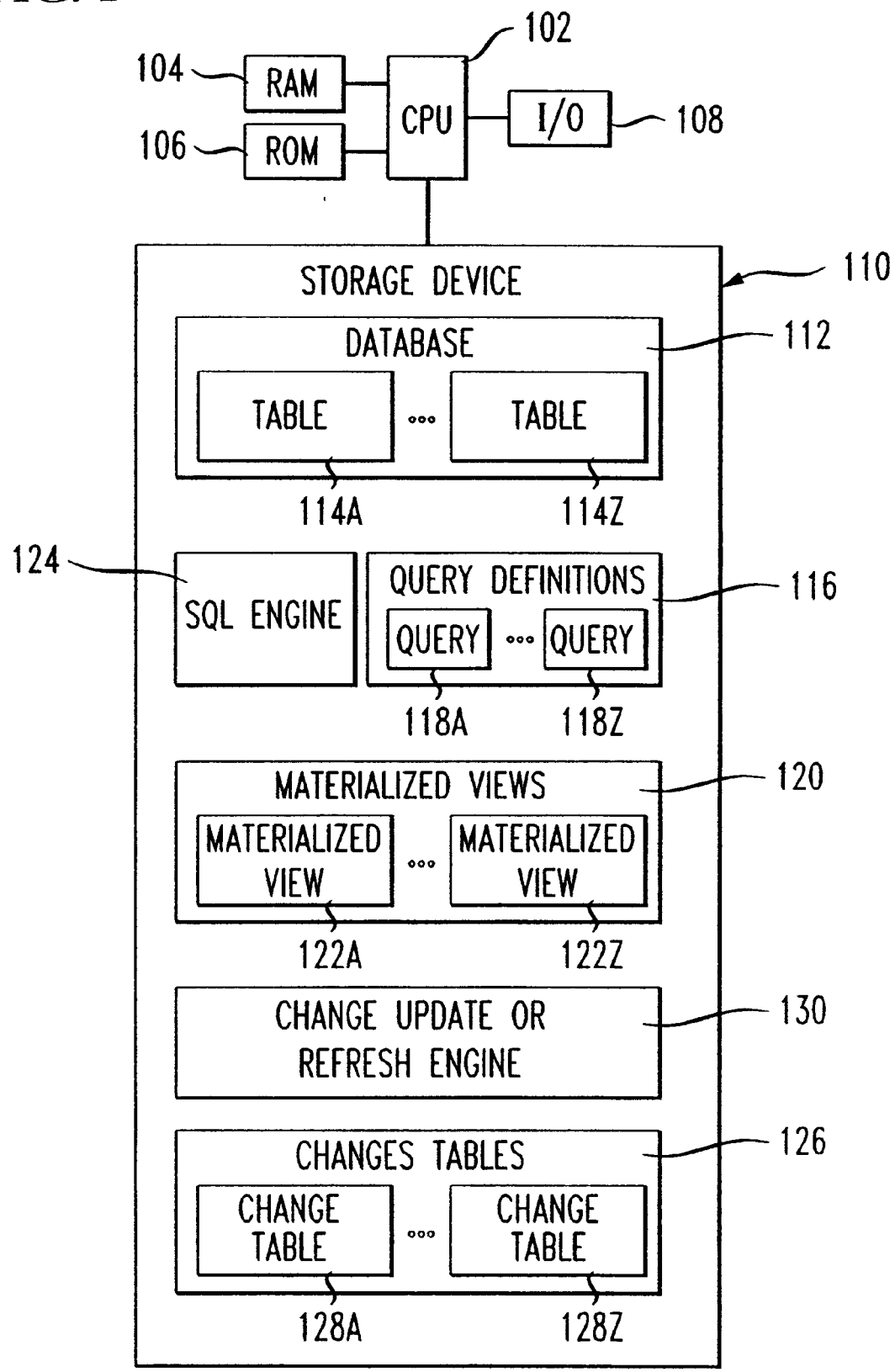
FIG. 1 is an exemplary block diagram of a database system, according to the present invention.

An exemplary database system 100, according to the present invention, is shown in FIG. 1. System 100 includes central processing unit (CPU) 102, which is connected to random access memory (RAM) 104, read-only memory (ROM) 106, input/output devices (I/O) 108 and storage device 110. CPU 102 may comprise a microprocessor, for example, an INTEL PENTIUM processor, or CPU 102 may comprise a mini-computer or mainframe processor. RAM 104 and ROM 106 store program instructions that are executed by CPU 102 and data that is used during program execution. I/O devices 108 may include any devices used to input data to system 100, such as a keyboard, mouse, trackpad, trackball and graphics tablet, to output data from system 100, such as a display and a printer, and to both input and output data, such as a modem and a network adapter. Storage device 110, which stores data that is used by the present invention, may comprise, for example, random-access memory, a magnetic disk and/or optical disk and may also comprise a magnetic tape.

Storage device 110 includes database 112, which is typically stored as one or more files. Database 112 includes one or more tables 114A–Z, which are compilations of information. Generally, tables are conceptualized as being organized in rows and columns, although the storage format may be different. Query definitions 116 include one or more queries 118A–Z, which are specifications of operations that are to be performed on one or more tables 114 in database 112 or on one or more materialized views 120. Queries are typically written using SQL. Materialized views 120 includes one or more materialized views 122A–Z, each of which is the result of a query that has been performed. Each view is a compilation of information, similar in structure to a table. A view that has been stored is usable, like a table, as an input to a query. Such a view is termed a materialized view. A query may therefore be performed on one or more materialized views, or on a combination of materialized views and tables. SQL Engine 124 is typically a software module that performs the operations specified by the queries and generates the views.

Change tables 126 include one or more change tables 128A–Z. A change table, according to the present invention, is a compilation of updates that are to be performed to a particular materialized view. In order to update a materialized view, the corresponding change table cannot be simply inserted or deleted from the materialized view. Rather, the change table must be applied to the materialized view using a novel update operation that is another aspect of the present invention. The performance of this update operation is indicated by use of a "refresh" operator, denoted refresh. Change update or refresh engine 130 is typically a software module that performs the refresh operation to apply a change table to its associated materialized view.

Figure 2:
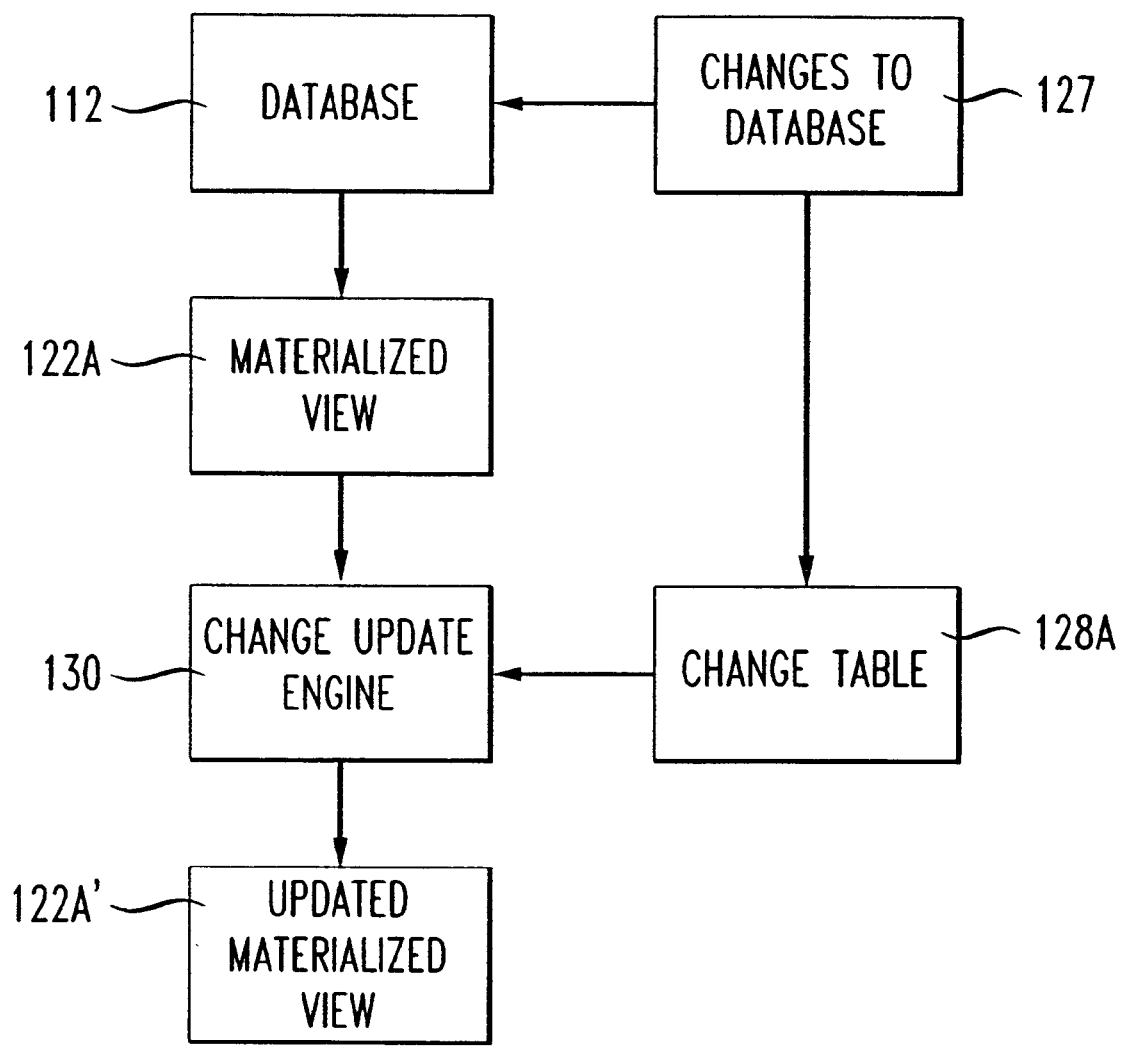
FIG. 2 is a data flow diagram of the present invention.

The flow of data in the present invention is shown in FIG. 2. Materialized view 122A is initially generated based on database 112. Changes 127 are made to database 112, necessitating updating of materialized view 122A. Rather than regenerate materialized view 122A based on database 112, the present invention generates change table 128A, which is a compilation of updates that are to be performed to materialized view 122A. Change table 128A and materialized view 122A are input to change update engine 130, which performs the refresh operation to apply change table 128A to its associated materialized view 122A. The result is updated materialized view 122A'.

1. Notation

The present invention is described using bag semantics, that is, all the relational operators used are duplicate preserving. The notation used to describe the present invention is defined as follows:

$\uplus$ denotes bag union, $\dot{-}$ denotes monus (bag minus), $\nabla E$ denotes deletions from a bag-algebra expression E, $\Delta E$ denotes insertions into E, $\sigma_p$ denotes selection on condition p, $\Pi_A$ denotes duplicate preserving projection on a set of attributes A, $\pi$ denotes the generalized projection operator (note that slightly different symbols are used for duplicate-preserving projection ($\Pi$) and for generalized projection ($\pi$) operators), $\times$ denotes the cross-product, $\bowtie$ denotes natural join, $\bowtie_J$ and $\stackrel{fo}{\bowtie}_J$ denote, respectively, join and full outer-join operations with the join condition J.

$\stackrel{lo}{\bowtie}_J$ and $\stackrel{ro}{\bowtie}_J$ denote, respectively, left and right outer-join.

Attrs(J) denotes the set of attributes used in a predicate J or a relation J.

The only operators that may require explanation are the outerjoin and generalized projection operators. The $\stackrel{fo}{\bowtie}_J$ (full) outerjoin differs from an ordinary join by including in the result any "dangling" tuple (dangling tuples are the ones that fail to join with any tuple from the other relation) of either relation after "padding" it with NULL's in those attributes that belong to the other relation. For example, $R(A, B) \stackrel{fo}{\bowtie}_{R.B=S.B} S(B, C)$ tuple (a, b, NULL, NULL), if (a, b)$\in$R and (b, c)$\notin$S for any c. One variant of the outerjoin operator is a left (right) outerjoin, where the dangling tuples of only the left (right) operand relation are padded with NULL's and included in the result. Hence, the above example, (a, b, NULL, NULL) would be included in $R\stackrel{lo}{\bowtie}_J S$, but not in $R\stackrel{ro}{\bowtie}_J S$. The generalized projection operator introduced in an article by A. Gupta, V. Harinarayan, and D. Quass., entitled Generalized projections: A powerful approach to aggregation, published in *Proceedings of the 21st International Conference on Very Large Databases*, Zurich, Switzerland, Sep. 11–15 1995, is used to algebraically represent the group by operation of SQL. For example, the following expression could be used to define the SISales view ($V_1$) of Example 1:

$$V_1 = \pi_{storeID, itemID, SumSISales=sum(price), NumSISales=count(*)}(\sigma_{date>1/1/95}(sales))$$

For a set of attributes G, the notation $\equiv_G$ is used to represent the predicate $$\ddot{E}_{g \in G}(LHS.g = RHS.g)$$

in a join condition, where LHS and RHS are the right and left operand relations of the join operator. For example, the expression $R \bowtie_J S$, where J is ($\equiv_G \ddot{E} p$), represents a join operation with the join condition ($\ddot{E}_{g \in G}(R.g.=S.g.)\ddot{E}p$), for a predicate p and a set of attributes G in R and S.

2. Motivating Example

EXAMPLE 1

Consider the classic example of a warehouse containing information about stores, items, and day-to-day sales. The warehouse stores the information in three base relations: stores, items, and sales defined by their schemas as follows.

stores (storeID, city, state)
items (itemID, category, cost)
sales (storeID, itemID, date, price)

For each store location, the relation stores contains the storeID, the city, and the state in which the store is located. For each item, the relation items contains its itemID, its category and its purchase price (cost). An item can belong to multiple categories, e.g. a whitening toothpaste could belong to dental care, cosmetics, and hygiene categories. The relation sales contains detailed information about sales transactions. For each item sold, the relation sales contains a tuple storing the storeID of the selling store, itemID of the item sold, date of sale, and the sale price.

Consider the following views SISales, CitySales, CategorySales, SSInfo, and SSRecentInfo defined over the base relations. The view SISales computes for each storeID and itemID the total price of items sold after Jan. 1, 1995. The view SISales is an intermediate table used to define the views CitySales and CategorySales. The view CitySales stores, for each city, the total number and dollar value of sales of all the stores in the city. The view CategorySales stores the total sale for each category of items. All the above described views consider only those sales that occur after Jan. 1, 1995. The view SSInfo stores the full outerjoin of the base relations sales and stores, retaining stores that have had no sales, for some reason, and also retaining those sales whose corresponding storeID is missing from the table stores, because, perhaps, the table stores has not been updated yet. The view SSRecentInfo retains only the recent sales information from the view SSInfo, discarding sales that occurred before Jan. 1, 1995. The views CitySales, CategorySales, and SSRecentInfo are the only views that are stored (materialized) at the data warehouse and this is represented below by the keyword "MATERIALIZED" in the SQl, definitions of the views. The keyword "MATERIALIZED" is not supported by SQL, but has been introduced as an aspect of the present invention. These materialized views are to be maintained in response to changes at the base relations.

CREATE VIEW SISales AS
SELECT storeID, itemID, sum(price) AS SumSISales, count(*) AS NumSISales
FROM sales
WHERE date >Jan. 1, 1995
GROUP BY storeID, ItemID
CREATE MATERIALIZED VIEW CitySales AS
SELECT city, sum (SumSISales) AS SumCiSales, sum (NumSISales) AS NumCiSales
FROM SISales, stores
WHERE SISales.storeID=stores.storeID
GROUP BY city
CREATE MATERIALIZED VIEW CategorySales AS
SELECT category, sum (SumSISales) AS SumCaSales, sum(NumSISales) AS
NumCaSales
FROM SISales, items
WHERE SISales.itemID=items.itemID
GROUP BY category
CREATE VIEW SSInfo AS
SELECT*
FROM sales FULL OUTERJOIN stores
WHERE sales.storeID=stores.storeID
CREATE MATERIALIZED VIEW SSRecentInfo AS
FROM SSInfo
WHERE date≧Jan. 1, 1995

Consider the database sizes shown in Table 1. Assuming that the base relation sales has one billion sales transactions, and the base relations stores and items have 1,000 and 10,000 tuples respectively. The various maintenance approaches are illustrated for the particular case when 10,000 tuples are inserted into the base relation sales. Table 1 shows the number of tuples changed in the views, as the result of the insertion of 10,000 tuples into sales. The table also shows the number of tuple accesses (reads and writes) incurred by different maintenance techniques to update the materialized views. Counting tuple accesses is a simple model and suitable for our purposes, because under uniform access the number of tuple accesses directly translate into number of disk accesses. The names $V_1$, $V_2$, $V_3$, $V_4$, and $V_5$ are used as follows:

$V_1$=SISales,
$V_2$=CitySales,
$V_3$=CategorySales,
$V_4$=SSInfo, and
$V_5$=SSRecentInfo.

It is assumed that the relations stores and items are small enough to fit in main-memory.

TABLE 1

Benefits of propagating change tables
(Materialized views are $V_2$, $V_3$, and $V_5$.)

| | | Changes | Tuple Reads and Writes | |
| Summary Table | Number of Tuples | (No. of Tuples) | Previous Work | Present Invention |
| --- | --- | --- | --- | --- |
| sales | 1,000,000,000 | 10,000 | | |
| stores | 1,000 | — | | |
| items | 10,000 | — | | |
| $V_1$ = SISales | 1,000,000 | 600 | 610,000 | 10,000 |
| $V_2$ = CitySales | 100 | 10 | 1,020 | 1,020 |
| $V_3$ = CategorySales | 1,000 | 1,000 | 12,000 | 12,000 |
| Total for $V_1$, $V_2$, $V_3$, | | | 623,020 | 23,020 |
| $V_4$ = SSInfo | 1,000,000,010 | 10,000 | 2,000,000,010 | 11,000 |
| $V_5$ = SSRecentInfo | 100,000 | 100 | 200 | 200 |
| Total for $V_4$ and $V_5$ | | | 2,000,000,210 | 11,200 |

Rather than computing and propagating insertions and deletions beyond an aggregate node $V_1$, as was done in the prior art, the present invention computes and propagates a change table for $V_1$. A change table is a general form of the summary-delta tables introduced in an article by I. Mumick, D. Quass, and B. Mumick, entitled Maintenance of data cubes and summary tables in a warehouse, published in *Proceedings of the AGM SIGMOD International Conference of Management of Data*, Tucson, Ariz., June 1997.

The symbol V is used to denote the change table of a view V. It is shown that propagation of change tables yields very efficient and simple maintenance expressions for general view expressions involving aggregate and outerjoin operators. The change table cannot be simply inserted or deleted from the materialized view. Rather, the change table must be applied to the materialized view using a special "refresh" operator. In Section 4, a refresh operator that is used to refresh views using the change tables is defined. The symbol $\sqcup_\theta^U$ is used to denote the refresh operator, where θ and U are parameters specifying join conditions and updated functions respectively.

An example of the computation of change tables and refreshing of the CategorySales ($V_3$) view 301 is shown in FIG. 3, when an exemplary sales table 302 is updated with insertions Δsales 304. As seen by its SQL definition, CategorySales is an aggregate view based on another aggregate view, SISales and on the items table 305. SISales is an aggregate view that is based on the sales table 304 and not on any other materialized views. Thus, SISales is termed a first-level materialized view, while CategorySales is a higher-level materialized view. A change table for SISales, change table $V_1$ 306 is generated based on the insertion table Δsales 304, as well as any deletion tables ∇sales (not shown). Since table $V_1$ 306 is associated with first-level materialized view, it is termed a first-level change table. In order to update CategorySales ($V_3$) view 301, which is a higher-level view, a change table for CategorySales ($V_3$) view 301 must be generated. This is done by propagating change table $V_1$ 306 upward to form a higher-level change table for the CategorySales ($V_3$) view, $V_3$ 308. Change table $V_3$ 308 is applied to view $V_3$ using the refresh operator $\sqcup_\theta^U$ to form refreshed view $V_3$ 312.

The example starts with computing the change table $V_1$ 306 that summarizes the net changes to $V_1$. For this first level of aggregates, the expression that computes $V_1$ 306 is similar to that derived in the article by Mumick, Quass and Mumick.

$$V_1 = \pi_{storeID,itemID,SumSISales-sum(price),NumSISales-sum(\_count)}$$
$$(\Pi_{storeID,itemID,price,\_count=1}(\sigma_p(\Delta sales))$$
$$\uplus \Pi_{storeID,itemID,price--price,\_count=-1}(\sigma_p(\nabla sales))), \text{ where } p \text{ is }$$
$$(date > Jan. 1, 1995).$$

FIG. 3 presents an instance of the base relation sales 302 and the table Δsales 304, which is the set of insertions into sales. For the given tables, FIG. 3 also shows the computed change table $V_1$ 306. Next the change table $V_1$ 306 is propagated upwards to derive expressions for the change tables $V_2$ (not shown) and $V_3$ 308

$$V_3 = \pi_{category,SumCaSales-sum(SumSISales),NumCaSales-sum(NumSISales)}$$
$$(V_1 \bowtie items)$$

FIG. 3 shows how the change table $V_3$ 308 is computed and the CategorySales ($V_3$) view is refreshed. The change table $V_2$ can be similarly computed. The new propagated change tables are then used to refresh their respective materialized views $V_2$ and $V_3$ using the refresh equations below (disregard θ and U for now). The details of the refresh equations are given in Example 3. Note that $V_1$ does not need to be refreshed.

$$V_2 = V_2 \sqcup_{\theta_2}^{U_2} V_2, \text{ and } V_3 = V_3 \sqcup_{\theta_3}^{U_3} V_2.$$

The refresh operation is illustrated by showing how the CategorySales view ($V_3$) is refreshed. FIG. 3 shows the materialized table $V_3$=CategorySales for the given instance of base tables.

Going back to computing the number of tuple accesses in Table 1, note that most of the computation is done in computing $V_1$, which requires 10,000 tuple accesses to read Δsales. Given the small sizes of $V_1$, items, and stores, the rest of the computation can be done in main memory and hence, the total number of tuples accesses is 10,000(to read Δsales)+11,000(to read items and sales)+2,020(to refresh $V_2$ and $V_3$)=23,020, showing that our technique is very efficient in comparison to previous approaches.

Figure 5:
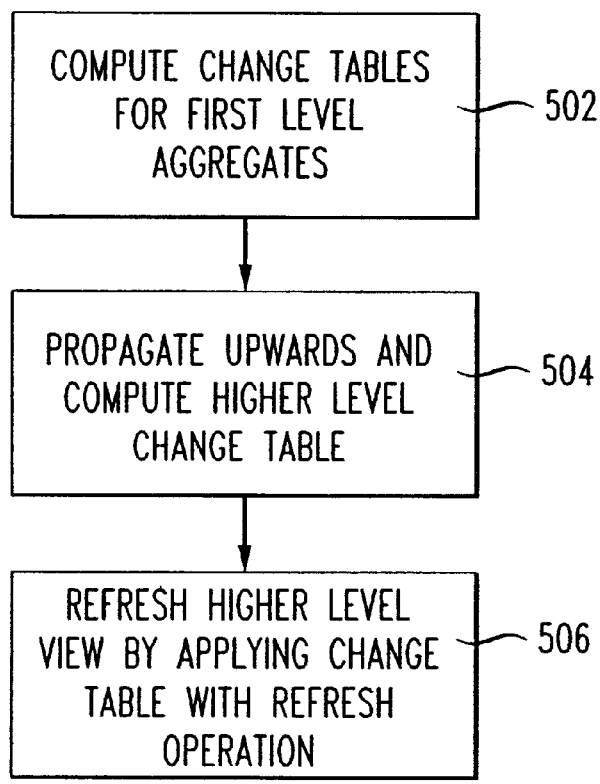
FIG. 5 is a block diagram of a general process for refreshing an aggregated materialized view, according to the present invention.

A block diagram of a general process 500 for refreshing an aggregated materialized view is shown in FIG. 5. In step 502, change tables are computed for the first-level aggregates on which the higher-level materialized view being refreshed is based. In step 504, the first-level change tables are propagated upwards and the higher-level change table is computed. In step 506, the higher-level materialized view is refreshed by applying the higher-level change table to the higher-level materialized view with the refresh operation.

Figure 6:
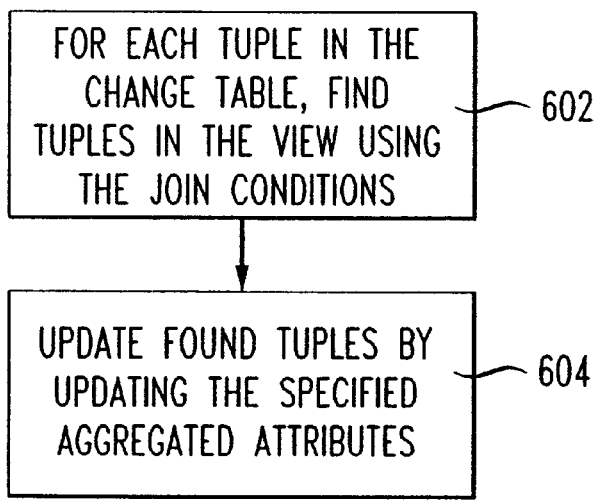
FIG. 6 is a block diagram of a general refresh operation performed in the process shown in FIG. 5.

A block diagram of a general refresh operation, as performed in step 506, is shown in FIG. 6. The refresh operation is represented by the notation $V = V \sqcup_\theta^U V$ Thus, an updated view V is generated by applying the change table V to the unupdated view V using the refresh operation. The refresh operation take two parameters. The parameter denoted θ specifies the join conditions, which are used to match the tuples in V, which are to be updated, to the tuples in V that contain the updates. The parameter denoted U is a list of update function specifications, that is, a list of which tuple attributes are to be updated and the operations that are to be performed in order to update each attribute.

In step 602, for each tuple in the change table V, a tuple in the view V is found using the join conditions specified by parameter θ. In the example of FIG. 3, the join condition $\theta_3$ specifies matching a non-aggregated attribute of tuples in the view and change table, and the update function $U_3$ specifies updating of at least some of the aggregated attributes of the tuples in the view. Thus, for each tuple $v_3$ in $V_3$, a match in $V_3$ using the join condition $V_3$ category=$V_3$ category (specified in $\theta_3$) is sought. The tuple $v_3$=<C1, 170,3> in $V_3$ matches with the tuple $v_3$=<C1,690,4> of $V_3$.

If a new tuple is inserted into the underlying table E, then no tuples will be found in the materialized view V that match a tuple in the change table V. The tuple in the change table will be inserted into the view. If there are a plurality of such tuples to be inserted, all such insertions will be converted to aggregated insertions or updates into by the refresh equation. The deletions from E need not necessarily result in any deletions from V. A tuple is deleted from V only if an aggregated attribute representing a count of a number of tuples in a group represented by a the tuple becomes zero, which is independent of the deletions of the deriving tuples from E.

In step 604, the found tuples are updated by updating the specified attributes. The tuple <C1,170,3> in $V_3$ means that three more sales totaling $170 have occurred for C1 category. The total sales for C1 are now 7 for a total amount of $860. To reflect the change, the tuple V is updated to <C1,860,7> by adding together the corresponding aggregated attributes (specified by the $U_3$ parameter of the refresh operator).

Outerjoins

The change-table technique can also be used for maintenance of view expressions involving outerjoin operators. Outerjoin views are supported by SQL and are commonly used in practice, such as for data integration. The technique for maintaining outerjoin views by deriving maintenance expressions for outerjoin views $V_4$ and $V_5$ is illustrated. The net changes to $V_4$, in response to insertions Δsales into sales, can be succinctly summarized in a change table $V_4$. The change table $V_4$ is computed and then propagated up as follows:

$$V_4 = \Delta sales \bowtie_{sales.storeID=stores.storeID}^{lo} stores$$

$$V_5 = \sigma_{(date \geq 1/1/95)}(V_4)$$
$$V_5 = V_5 \sqcup_{\theta_5}^{U_5} V_5$$

FIG. 4 shows the materialized view $V_5$ 402, the change tables $V_4$ and $V_5$ 404 for the database instance of FIG. 3, and the refreshed view $V_5$ 406.

The process for refreshing an outerjoin view is similar to the process for refreshing an aggregate view. First-level change tables are computed, in the example of FIG. 4, using the equation $V_4 = \Delta sales \bowtie_{sales.storeID=stores.storeID} stores$. The first-level change tables are propagated upwards and the higher-level change table is computed, in the example of FIG. 4, using the equation $V_5 = \sigma_{(date \geq 1/1/95)}(V_4)$. The higher-level materialized view is refreshed by applying the higher-level change table to the higher-level materialized view with the refresh operation, in the example of FIG. 4, using the equation $V_5 = V_5 \sqcup_\theta^U V_5$.

The major difference is in the specification of the refresh operation. For example, the refresh of $V_5$ proceeds as follows. When an outerjoin is performed, two or more tables are merged to form a new table or view. The new table or view has a tuple corresponding to each value of a selected attribute or attributes present in any original table. Since it is not required that there be tuples corresponding to each value of the selected attribute in all original tables, the values of some attributes in the new table or view may be undefined. This is represented in FIG. 4 as NULL. Insertions into an original table may result in tuples being inserted into the new table or view, if no tuples in the view match the tuple in the change table, or they may result in undefined attributes being defined. Likewise, deletion from an original table may result in tuples being deleted from the new table or view, if the value of the selected attribute in that tuple is no longer present in any original table, or they may result in defined attributes becoming undefined.

For example, each tuple in $V_5$ is matched with tuples in V5 that have the same stores attributes, but have all NULL's in the attributes of sales. This join condition used for matching is specified in $\theta_5$. In the example of FIG. 4, the only matching pair is (v5, v5), where v5=<NY3,13,1/1/92, 100,NY3,Buffalo,NY>∈$V_5$ and $v_5$=<NULL,NULL,NULL, NULL,NY3,Buffalo,NY>∈$V_5$. The match results in an update of v5 to v5, according to the update specifications in $U_5$. The remaining unmatched tuples in $V_5$ are inserted into the view $V_5$. The refreshed view $V_5$ is also shown in FIG. 4.

Given the small sizes of stores, $\nabla$sales, and $V_4$, the number of tuple accesses required to compute the change tables and refresh $V_5$ is 10,000(to read $\Delta$sales)+1,000(to read stores)+200(to refresh $V_5$).

The present invention includes a novel technique to maintain general view expressions involving outerjoin operators. Previous work, for example, the article by A. Gupta, H. V. Jagadish, and I. S. Mumick, entitled Maintenance and self-maintenance of outerjoin views published in *Proceedings of the NGITS*, Tel Aviv, Israel, June 1997, only considers views that have outerjoin as the last operator. To apply the technique of that article to our example, it would be necessary to compute the intermediate view SSInfo, thereby incurring more than a billion tuple accesses.

3. The Change-Table Technique for View Maintenance

This section explains the framework developed in the article by Xiaolei Qian and Gio Wiederhold entitled Incremental recomputation of active relational expressions. Published in *IEEE Transactions on Knowledge and Data Engineering*, pages 337–341, 1991, and the article by T. Griffin and L. Libkin entitled Incremental maintenance of views with duplicates published in *Proceedings of the ACM SIGMOD International Conference on Management of Data*, pages 328–339, San Jose, Calif., May 1995, for deriving incremental view maintenance expressions and relate it to the change-table technique of the present invention.

Let a database contain a set of relations R={$R_1, R_2, \ldots, R_n$}. A change transaction t is defined to contain for each relation $R_i$ the expression $R_i \leftarrow (R_i - \nabla R_i) \uplus \Delta R_i$, where $\nabla R_i$ is the set of tuples to be deleted from $R_i$, and $\Delta R_i$ is the set of tuples to be inserted into $R_i$.

Let V be a bag-algebra expression defined on a subset of the relations in R. The refreshed-expression New(V, t) is used to compute the new value of R. In the article by Griffin and Libkin (which uses the notation pre(t, V) instead) the expression New(V, t) is defined to be:

$$New(V, t) = (V - \nabla(V, t)) \uplus \Delta(V, t).$$

So, the goal in deriving view maintenance expressions for a view V is to derive two functions $\nabla(V, t)$ and $\Delta(V, t)$ such that for any transaction t, the view V can be maintained by evaluating $(V - \nabla(V, t)) \uplus \Delta(V, t)$. In order to derive $\nabla(V, t)$ and $\Delta(V, t)$, the article by Griffin and Libkin gives change propagation equations that show how deletions and insertions are propagated up through each of the relational operators. The work of Griffin and Libkin was extended to include aggregate operators by D. Quass, *Materialized Views in Data Warehouses*, Ph.D. thesis, Stanford University, Department of Computer Science, 1997, Chapter 4.

The change-table technique of the present invention can be thought of as introducing a novel definition for New(V, t). The expression New(V, t) for view expressions involving aggregates and outerjoin is redefined as $$New(V, t) = (V \sqcup_\theta^U (V, t)),$$

where (V, t) is called the change table, $\sqcup_\theta^U$ is the refresh operator used to apply the net changes in a change table to its view, and ($\theta$, U) are the parameters of the refresh operator. The parameter $\theta$ specifies the join conditions on the basis of which the tuples from the change table and the view are matched. The parameter U specifies the functions that are used to update the matched tuples in V.

The new definition of New(V, t) is motivated from the following observation. In the case of general view expressions involving aggregate operators, it is usually more efficient to propagate the change tables beyond an aggregate operator, instead of first computing and then propagating insertions and deletions. Propagation of the change table is particularly efficient when the change table depends only on the changes to the base relation, while the insertions and deletions depend on the old value of the view. As shown in the motivating example, if the aggregate node is not materialized, the computation of insertions and deletions could be very expensive.

The new definition of New(V, t) means that it is necessary to define a general refresh operator, and derive change propagation equations for propagating change tables through various relational, aggregate and outerjoin operators, to obtain a complete technique for efficient incremental maintenance of general view expressions. In the following section, a formal definition of the refresh operator is presented. In later sections, change propagation equations for general view expressions involving aggregate and outerjoin operators is derived.

4. The refresh Operator

In this section, a formal treatment of the refresh operator is given. Given a materialized table V and its change table V, the refresh is used to apply the changes represented in a change table. The binary refresh operator is a generalization of the refresh algorithm used in the article by Mumick, Quass and Mumick.

The refresh operator is denoted by $\sqcup_\theta^U$, where $\theta$ is a pair of two mutually exclusive join conditions and U is a list of update function specifications. The refresh operator takes two operands, a view V to be updated and a corresponding change table (denoted by $\overline{V}$).

Let V and $\overline{V}$ be views with the same attribute names $A_1$, $A_2 \ldots, A_n$. The subscript $\theta$ associated with the operator is a pair of join conditions $\Im_1$ and $\Im_2$. The superscript U is a list specifying the attributes that may be changed by the change operator, along with the update functions that specify the exact nature of the change to each attribute being changed. More precisely, $U=\langle(A_{i_1}, f_1), (A_{i_2}, f_2), \ldots, (A_{i_k}, f_k)\rangle$, where $A_{i_1}, \ldots, A_{i_k}$ are attributes of $\overline{V}$ and $f_1, \ldots, f_k$ are functions. Unless otherwise specified, it is assumed that the functions in U are binary functions. In an expression $V \sqcup_\theta^U \overline{V}$, each tuple $\overline{v}$ of $\overline{V}$ is checked for possible matches (due to $\Im_1$ or $\Im_2$) with tuples in V. If a match is found due to the join condition $\Im_1$, then the corresponding matching tuple v of V is updated as described in the next paragraph (using the specifications in the update list U). If the match is due to $\Im_2$, the tuple v of V is deleted. The unmatched tuples in $\overline{V}$ are inserted into V. The matching done is one-to-one in the sense that a tuple $v \in V$ matches with at most one tuple in $\overline{V}$ and vice-versa. If $\overline{v}$ finds more than one match in V, then an arbitrary matching tuple from V is picked.

Update of a tuple v of V matching with the tuple $\overline{v}$ of $\overline{V}$ is done based on the update functions in U. For each pair $(A_{i_j}, f_j)$ in U, the $A_{i_j}$ attribute of v is changed to $f_j(v(A_{i_j}), \overline{v}(A_{i_j}))$ where $v(X)$ and $\overline{v}(X)$ denote the values of the X attribute of v and $\overline{v}$ respectively. Each pair in U is used to change the matching U is used to change the matching tuple V.

EXAMPLE 2

Consider the view $V_3$=Categorysales defined in Example 1 earlier. The CategorySales table as defined in Example 1 computes the total sales for each category. In this example, the refresh operation is illustrated by applying the changes summarized in a change table CategorySales to its view CategorySales using the refresh operator.

For this example, consider the instance of the base table shown in FIG. 3. FIG. 3 also shows the materialized table Categorysales for the given instance. In response to the insertion of the table $\Delta$sales into the base table sales, the change table CategorySales can be computed and is shown in the FIG. 3. The view CategorySales is refreshed using the expression CategorySales $\sqcup_{\theta_3}^{U_3}$ CategorySales, where the parameters, $\theta_3=(\Im_1, \Im_2)$ and $U_3$, of the refresh operator are defined as follows.

$\Im_1$ is $(\equiv_{category} \land ((\text{CategorySales.NumCaSales}+ (\overline{\text{CategorySales}}).\text{NumCaSales}) \neq 0))$ $\alpha_2$ is $(\equiv_{category} \land ((\text{CategorySales.NumCaSales}+ (\overline{\text{CategorySales}}).\text{NumCaSales})=0))$ $U_3=\langle(\text{SumCaSales}, f),(\text{NumCaSales}, f)\rangle$, where $f(x,y)=x+y$ for any x, y.

Note that $\equiv_{category}$ represents the predicate (CategorySales.category=($\overline{\text{CategorySales}}$).category) here. Now, the refresh operation is attempted to be run on the change table CategorySales and the view CategorySales of FIG. 3.

The first tuple $\overline{v}_3=\langle C1,170,3\rangle$ of $\overline{\text{CategorySales}}$ matches with the tuple $v_3=\langle C1,690,4\rangle$ in CategorySales using the join condition $\Im_1$. The match results in update of the tuple $\langle C1,690,4\rangle$ in CategorySales according to the specifications in the update list $U_3$. The attribute SumCaSales of the tuple $v_3$ is changed to $v_3.\text{SumCaSales}+\overline{v}_3.\text{SumCaSales}=170+690=860$ and the attribute NumCaSales is changed to 4+3=7.

Similarly, the tuple $\langle C2,210,2\rangle \in \overline{V}_3$ matches with the tuple $\langle C2,120,2\rangle \in V_3$ and is updated to $\langle C2,330,4\rangle$. The tuple $\langle C3,480,2\rangle \in V_3$ is also updated to $\langle C3,530,3\rangle$ accordingly.

To illustrate deletion from the view Categorysales, let us assume that the change table Categorysales contains a tuple $b=\langle C2,-210,-2\rangle$ as a result of a deletion of a couple of tuples from the sales table. The tuple b will match with the tuple $v=\langle C2,210,2\rangle \in V_3$ using the join condition $\Im_2$ and the match will result in deletion of the tuple v from $V_3$.

Implementation of the Refresh Operator

One simple way to implement the refresh operator is using a nested loop algorithm, with the change table as the outer table, and the materialized view table as the inner table, as shown in Appendix A. The nested loop algorithm is just one possible way to implement the refresh operator. Quass and Mumick have developed a more efficient implementation of the refresh operation that uses existing outer-join methods inside the DBMS. They defined a modify operator using a pair of join conditions and a series of condition-action lists. The modify operator can be easily implemented in a DBMS through slight modifications of existing physical query operators for outerjoins, such as hash outerjoin, sort-merge outerjoin, and nested-loop outer-join. Cost-based optimization can be used to select the method most suitable for a given evaluation. Implementing the refresh operation of the present invention using the modify operator is significantly faster than iterative algorithms.

5. Propagating Change Tables Generated at Aggregates

In this section, the derivation is given for the algebraic equations to (1) generate change tables at an aggregation node in a view expression, and (2) propagate these change tables through the relational, aggregate and outerjoin operators in a general view expression.

DEFINITION 1 (Aggregate-change Table)

A change table for a view expression involving aggregates is defined as an aggregate-change table if the change table either originated at an aggregate operator or is a result of propagation of a change table that originated at an aggregate node, using the propagation equations presented in Table 3.

For example, the change tables, $\overline{V}_1, \overline{V}_2,$ and $\overline{V}_3$, computed for the views $V_1, V_2,$ and $V_3$ respectively in Example 1 are aggregate-change tables.

Note that the notions of aggregate-change table and outerjoin-change table have been defined only for simplifying the presentation of the material in this article. The present invention contemplates a general change table that encompasses aggregate-change tables, outerjoin-change tables and any other specific type of change table.

DEFINITION 2 (Distributive Functions)

An aggregate function is defined as distributive if it can be computed by partitioning the input parameters into disjoint sets of parameters, aggregating each set individually, then further aggregating the (partial) results from each set into the final result.

DEFINITION 3 (Self-maintainable Aggregates)

An aggregate function is defined to be self-maintamnable if the new value of the function can be computed solely from the old value of the function and the changes (insertions or deletions) to the base data.

It will be shown that a special case of the general refresh operator is sufficient to apply the changes summarized in an aggregate-change table to its view. The special form yields very simple change propagation equations for propagation of aggregate-change tables through relational, aggregate and outerjoin operators.

The notation Attrs(X) is used to represent the set of attributes referenced in X. Thus, Attrs(U) refers to the set of attributes specified in the update list U and Attrs($\theta$) represents Attrs($\Im_1$)$\cup$ Attrs($\Im_2$), where $\Im_1$ and $\Im_2$ are the join conditions in $\theta=(\Im_1, \Im_2)$.

5.1 Generating the Aggregate-Change Table

Consider a view V defined as an aggregation over a select-project-join (SPJ) expression. In this section, a brief description is given of how an aggregate-change table is generated at V in response to the insertions and deletions at the base tables. The method is similar to that of generating "summary-delta tables" for a "summary table" as described in the article by Mumick, Quass and Mumick.

For the case when a view V is defined as an aggregation over an SPJ expression, the insertions and deletions to the base tables can be propagated to V as a single aggregate-change table, which is denoted by V. Without loss of generality, let us assume V to be $\pi_{G,B=f(A)}(R)$, where R is the SPJ subview, G is the set of group-by attributes, f is an aggregate function, and A is an attribute of R. In the case of distributive aggregate functions, the aggregate-change table V can be computed from the insertions and deletions into R by using the same generalized projection as the used for defining the view V. More precisely, V can be computed as $$V = \pi_{G,f(A), Count=sum(\_count)}(\Pi_{G,A,\_count=1}(\Delta R)$$
$$\uplus \Pi_{G,A=N(A),\_count=-1}(\nabla R)),$$

where the function N is suitably defined depending on the aggregate function $f$ as shown in Table 2. For example, in the case of a sum aggregate the function N negates the attribute value passed. Once the aggregate-change table has been computed, the net changes, now in the aggregate-change table, are then applied to the view using the refresh operator.

If the aggregate function $f$ is a self-maintainable aggregate function, then the special form of refresh operator defined in the next subsection is sufficient to apply the change table V to the view V. For the case of aggregate functions that are not self-maintainable, more complex functions are needed in the update list U of the refresh operator. For example, to handle deletions from a subview of a simple MIN/MAX aggregate view, the update function needs to compute the new MIN/MAX value, if needed, by accessing the base relations (see the article by Mumick, Quass and Mumick for details). The change propagation equations and other formalism presented in this article are independent of the complexity and input parameters of update functions used in the update list U of refresh.

TABLE 2

Table used to change the aggregate attributes in deletions

| Aggregate | Change due to N |
|---|---|
| COUNT(*) | −1 |
| SUM(expr) | −expr |
| MIN(expr) | expr |
| MAX(expr) | expr |

5.2 Refresh Operator for Applying Aggregate-Change Tables

For the case of applying net changes computed in an aggregate-change table to its view, the refresh operator required is a special case of the generic operator defined earlier in Section 4. The special characteristics of the refresh operator are used to derive simpler change propagation equations.

Recall that the expression used to refresh a view V using its change table V is $V = V \sqcup_\theta^U V$, where $\theta=(\Im_1, \Im_2)$ and U is the update list. In the case of the refresh operator used to apply aggregate-change tables, $\Im_1$ is ($\equiv_G \wedge \neg p$) and $\Im_2$ is ($\equiv_G \wedge p$), for some predicate p and a set of attributes G common to both V and V. As defined before, the notation $\equiv_G$ here represents the predicate $\wedge_{g \in G}(V._g = V._g)$, as V and V are the left and right operands of the join operator. Also, the set of attributes G is disjoint from the set of attributes, Attrs(U), that are being updated. The predicate p specifies when the matching tuple in V is to be deleted, i.e., when the value of the attribute that stores the number of deriving base tuples becomes zero.

An aggregate-refresh operator is derived that is a special form of the refresh operator (as described above) used to apply an aggregate-change table to its view. The characteristics of the aggregate-refresh operator are used to derive simple change propagation equations for propagating aggregate-change tables.

DEFINITION 4 (Aggregate-refresh Operator)

A refresh operator $\sqcup_\theta^U$ is said to be an aggregate-refresh operator if:

$\theta=(\Im_1, \Im_2)$ and the join condition $\Im_1$ is ($\equiv_G \wedge p_1$), and the join condition $\Im_2$ is ($\equiv_G \wedge p_2$), for some predicates $p_1$, $p_2$ and a set of attributes G common to both the view and its aggregate-change table.

$p_1 = \neg p_2$.

$G \cap Attrs(U) = \phi$.

5.3 Change Propagation Equations

Table 3 gives the change propagation equations for propagating aggregate-change tables through relational, aggregate and outerjoin operators. Below, is a brief explanation of each row of Table 3. In this table, it is assumed that an aggregate-change table has been generated at the first aggregate operator in a view expression, in response to insertions and/or deletions from the view's subview. The above base case has not been shown in the table. In Theorem 1, the correctness of the refresh equations of Table 3 is proven.

Each row in the table considers propagation of an aggregate-change table through a relational, aggregate or outerjoin operator. The first column gives the equation number used for later reference in examples. The second column in the table gives the definition of V. The third column expresses the new expression for V due to a change occurring at one of the subexpressions $E_1$ of V. In each row, possibly due to changes at base table, the subexpression $E_1$ changes to $E_1 \sqcup_\theta^U E_1$ where $E_1$ is an aggregate-change table and $\sqcup_\theta^U$ is an aggregate-change operator. It is assumed that $\theta$ is $(\Im_1, \Im_2)$, where $\Im_1$ is $\equiv_G \wedge \neg p_1$ and $\Im_2$ is $\equiv_G \wedge p_1$, for some predicate $p_1$ and a set of attributes G in $E_1$. The fourth column gives the refresh equation which is used to refresh the view V and also yields the value of the propagated aggregate-change table. In Theorem 1 it is proven that the refresh equation given in the fourth column is equivalent to the expression in the third column for each row of Table 3. Theorem 1 also proves that the refresh operator used in the refresh equations of fourth column is an aggregate-refresh operator. The fifth column gives the expression for the propagated aggregate-change table V. Finally, the last column of the table mentions the conditions under which the equivalence of the fourth column and third column expressions hold, i.e., conditions under which the change propagation can be done. If the condition is not satisfied, then the refresh equation cannot be used to propagate the aggregate-change table. Later, it will be shown how to handle changes at such an operator node, when the condition of Table 3 is not satisfied.

The first row of the table depicts the case of a selection view $V=\sigma_p(E)$, where E is a subexpression. In this case, as depicted in the third column, the subexpression E changes to $E\biguplus_\theta^U E$, where E is an aggregate-change table and $\biguplus_\theta^U$ is an aggregate-change operator. The expression for the propagated aggregate-change table $V=\sigma_p(E)$ is given in the fifth column. For the case of the selection view, the condition required for the change propagation is $Attrs(p) \subset G$. In other words, an aggregate-change table can be propagated through a selection operator if the selection operator if the selection condition is defined over the G attributes, which are the attributes that are not being updated.

The second row depicts the case of projection on a set of attributes A. The condition implies that an aggregate change table can be propagated through a duplicate-preserving projection only if all the attributes used in the join conditions of $\theta$ are included in the projection list A.

The third row considers the case of a cross product operation. In this case, the parameter $\theta$ of the refresh operator is changed to also include the condition $\equiv_{Attrs(E_2)}$ in the join conditions $\Im_1$, and $\Im_2$. No conditions are specified in the fifth column meaning that any aggregate-change table can be propagated through a cross product operator.

The fourth row depicting the case of a join operation follows from the combination of previous cases of selection and cross product.

The fifth row considers propagation of an aggregate-change table through the bag union operator. The expression for V in the fifth column gives only the change table ($V=E_1$). As the refresh equation in the fourth column shows, the refresh in this case is more complex than simply applying the change table. It is necessary to apply a set of deletions ($\nabla V=E_2$) into the view V. One can derive a very efficient refresh equation for the case of bag union operator, if the tuples in V are "tagged" L/R depending on whether they come from the left operand $E_1$ or the right, operand $E_2$.

The sixth row depicts the case of propagation through a generalized projection (aggregate) operator. For the purposes of aggregate-change tables, it is assumed that any subexpression involving an aggregate operator stores with each tuple a count of the number of deriving base tuples. This count is stored in a general attribute which is called the count attribute. For example, NumCiSales and NumCaSales are count attributes in the views $V_2$ and $V_3$ of Example 1. After propagation through the aggregate operator, the join conditions and the update specifications of the refresh operator change as shown in the fourth column. The attribute named Cnt used in $p_3$ is the count attribute of V. The condition in the fifth column says that each aggregate function $f_i$ is distributive, the set of group-by attributes G' is a subset of G, and the update list U used to change E contains $(A_i, f_i)$ for all $1 \leq i \leq k$. Note that the duplicate-elimination operation is a special case of generalized projection, and is covered by the sixth row.

The seventh row gives the refresh equation for the case of propagating an aggregate-change table through a full outer-join operation. In this case, the refresh operator specifications change as in the case of cross product. The outerjoin propagation equation in the seventh row is simplified a little (as discussed in Appendix C).

Note that no change propagation equation is given for the case of monus because an aggregate-change table cannot be propagated through the minus operator (See the paragraph on singularity points below). Also, the refresh operator used in each of the derived refresh equations of column 4 is an aggregate-refresh operator.

Singularity Points

The operator nodes in a view expression tree, where none of the refresh equations in Table 3 apply, are called singularity points. Consider a view V and a singularity point $V_1$, which is a subexpression of V, in the expression tree of V. As propagation of the change table $V_1$ is not possible, it is necessary to compute insertions ($\Delta V_1$) and deletions ($\nabla V_1$) into $V_1$ and propagate the insertions and deletions upwards. The tables $\Delta V_1$ and $\nabla V_1$ can be computed from $V_1$ by applying the refresh algorithm (Algorithm 1). If $V_1$ is not materialized, the base relations are used to compute (relevant parts of) $V_1$ whenever required by the refresh algorithm. The insertions ($\Delta V_1$) and deletions ($\nabla V_1$) to $V_1$ are then propagated through the singularity point using the change propagation equations described in the article by Griffin and Libkin, and in the article by Quass. The propagation insertions and deletions at a singularity point can now be propagated upwards using techniques presented in this article (as they may result in change tables further on) or the techniques of Griffin and Libkin for propagating insertions and deletions through relational operators.

THEOREM 1

Assume that the refresh operator used in the expression of the third column in Table 3 is an aggregate-refresh operator. Then, the change propagation equations given in Table 3 for propagation of aggregate-change tables are correct, i.e., for each row, the expression in the third column is equivalent to the refresh equation in the fourth column. Also, the refresh operator derived in the refresh equation (column 4) is an aggregate-refresh operator as well.

EXAMPLE 3

In this example, the techniques developed in this section are illustrated as applied to the views of the motivating Example 1. Recall from Example 1 the definitions of $V_1$(SISales), $V_2$(CitySales), and $V_3$(CategorySales). Thus:

$$V_1'=\pi_{storeID,itemID,SumSISales=sum(price), NumSISales=count(*)}(\text{sales})$$

$$V_1=\sigma_{date>1/1/95}(V_1')$$
$$V_2'=V_1 \bowtie \text{stores}$$

$$V_2=\pi_{city,itemID,SumSISales=sum(price),NumSISales=count(*)}(V_2')$$
$$V_3'=V_1 \bowtie \text{items}$$

$$V_3=\pi_{category,SumCaSales=sum(SumSISales),NumCaSales=sum(NumSISales)}(V_3')$$

where the (virtual) views $V_1'$, $V_2'$ $V_3'$ have been added for better illustration of how the aggregate-change tables propagation. The change propagation equations of Table 3 are used to derive the maintenance expressions for $V_2$ and $V_3$ in response to changes in sales, as follows.

$$V_1'=\pi_{storeID,itemID,SumSISales=sum(price),NumSISales=sum(\_count)}$$
$$(\Pi_{storeID,price,\_count=1}(\Delta\text{sales})$$
$$\biguplus \Pi_{storeID,price=-price,\_count=-1}(\nabla\text{Sales})) \quad \text{[From Section 5.1]}$$

$$V_1=\sigma_{date>1/1/95}(V_1') \quad \text{[From (1) in Table 3]}$$
$$V_1=V_1 \biguplus_{\theta_1}^U (V_1), \text{ where } \theta_1=(\equiv_{\{storeID,itemID\}} \wedge \neg p, \equiv_{\{storeID,itemID\}} \wedge p)$$
$$V_2'=V_1 \bowtie \text{stores}$$
$$V_2'=V_2 \biguplus_{\theta_1}^U V_2', \quad \text{[From (4) in Table 3]}$$

where $\theta_{12}$ is $(\equiv_{\{storeID,itemID\} \cup Attrs(stores)} \wedge \neg p,$
$\equiv_{\{storeID,itemID\} \cup Attrs(stores)} \wedge p)$ $V_2 = \pi_{city,SumSISales=sum(SumSISales),NumCiSales=sum(NumSISales)}$
$(V_2')$                                     [From (6) in Table 3]

$V_3' = V_1 \bowtie items$ $V_3' = V_3' \sqcup^U_{\theta_{13}} V_3',$                       [From (4) in Table 3]

where $\theta_{13}$ is $(\equiv_{\{storeID,itemID\} \cup Attrs(items)} \wedge \neg p,$
$\equiv_{\{storeID,itemID\} \cup Attrs(items)} \wedge p)$ $V_3 = \pi_{category,SumCaSales=sum(SumSISales),NumCaSales=sum(NumSISales)}(V_3')$ $V_3 = V_3 \sqcup^U_{\theta_3} V_3,$ where $\theta_3$ is $(\equiv_{category} \wedge \neg p,$
$\equiv_{category} \wedge p)$                [From (6) in Table 3]

In all the above equations, U is of the form <(SUM, $f$)(COUNT, $f$)> and p is of the form (LHS.COUNT+ RHS.COUNT)=0), where SUM is the aggregated attribute (SumSISales, SumCiSales, or SumCaSales) in the corresponding view, COUNT is the count attribute (NumSISales, NumCiSales, or NumCaSales) depending on the view, and $f(x, y)=x+y$ for all x, y. (Recall that LHS and RHS refer to the left and right operands of the join operation where p occurs.)

As described in Example 1, the above derived maintenance expressions for $V_2$ and $V_3$ are very efficient compared to the expressions derived by previous approaches.

6. Maintaining Outerjoin Views Efficiently

In this section, it is shown how our change-table techniques can be used to derive efficient and simple algebraic expressions for maintenance of view expressions involving outerjoin operators. Outerjoin is supported in SQL. Further, outerjoins have recently gained importance because data from multiple distributed databases can be integrated by means of outerjoin views. Outerjoins are also extensively used in object-related relational systems.

DEFINITION 5 (Outerjoin-change Table)

A change table for a view involving outerjoin operations is defined as an outerjoin-change table if the change table was either generated at an outerjoin operator or is a result of propagation of an outerjoin-change table, using the propagation equations that will be derived for propagating outerjoin-change tables.

For example, the change tables, $V_4$ and $V_5$, computed for the views $V_4$ and $V_5$ in Example 1 are outerjoin-change tables.

First, it is shown how the insertions and deletions into an outerjoin view ($R \bowtie_J S$), in response to insertions into the base table R, can be summarized into an outerjoin-change table. The next changes represented by the outerjoin-change table are then applied to the outerjoin view using the refresh operator. Computation of an outerjoin-change table at an outerjoin view in response to deletions from a base table requires a more general refresh operator, as discussed in Appendix C.

6.1 Generating Outerjoin-Change Table At An Outerjoin Node

Given tables $R(A_1, A_2, \ldots, A_n)$ and $S(B_1, B_2, \ldots, B_m)$, consider an outerjoin view $V(A_1, \ldots A_n, B_1, \ldots, B_m) = R \bowtie_J S$, where J is an equi-join condition. Insertions into R, $\Delta R$, result in some insertions and deletions into V. These set of insertions and deletions to V can be summarized into an outerjoin-change table V defined as $V = \Delta R \bowtie_J S$. Note that the tables V and V have the same schema and attribute names. It is shown that with the following specification of the refresh operator, the net changes in the outerjoin-change table V can be applied to the view V to obtain the correctly refreshed V. The specifications $\theta = (\mathfrak{J}_1, \mathfrak{J}_2)$ and U, of the refresh operator used to apply V to V are defined as follows.

$\mathfrak{J}_1$ is $(\equiv_G \wedge p)$ where $G = Attrs(S)$ and $p = (\overset{\vee}{E}_{1 \leq j \leq n}(V.A_j = NULL))$.

$\mathfrak{J}_2$ is FALSE.

The update list U of update function is $<(A_1, f), (A_2, f), \ldots, (A_n, f)>$, where $f(x, y) = y$ for all x, y.

THEOREM 2

Consider the view $V = R \bowtie_J S$ defined as above. For the above definition of V and the refresh operator specifications of $\theta = (\mathfrak{J}_1, \mathfrak{J}_2)$ and U, the following holds:

$$(R \uplus \Delta R) \bowtie_J S = (R \bowtie_J S) \sqcup^U_\theta (V)$$

6.2 Propagating Outerjoin-Change Tables

Only a special form of the generic refresh operator, which is called an outerjoin-refresh operator, is required to refresh a view using its outerjoin-change table.

DEFINITION 6 (Outerjoin-refresh Operator)

Let $\{A_1, A_2, \ldots, A_n, B_1, B_2, \ldots, B_m\}$ be the set of attributes in V and its outerjoin-change table V. A refresh operator $\sqcup^U_\theta$ used to apply the outerjoin-change table V to its view V is said to be an outerjoin-refresh operator if:

The join condition $\mathfrak{J}_1$ is $(\equiv_G \wedge p)$, where $G = \{B_1, B_2, \ldots, B_m\}$ and p is a predicate on the attributes (LHS.$A_1$, LHS.$A_2$, \ldots, LHS.$A_n$). The join condition $\mathfrak{J}_2$ is FALSE.

U is $<(A_1, f), (A_2, f), \ldots, (A_n, f)>$, where $f(x, y) = y$ for all x, y. Note that Attrs(U)$\cap$G=$\phi$ and Attrs(U)$\cap$G= Attrs(V).

The refresh equations given in Table 3 correctly propagate an outerjoin-change table as well, except for the case of propagation through the outerjoin operator, for which a different equation is derived, as follows: Consider a view $V = E_1 \bowtie_J E_2$ where $E_1$ and $E_2$ are general view expressions. Suppose that the expression $E_1$ is refreshed to $E_1 \sqcup^U_\theta E_1$ using its outerjoin-change table $E_1$ where the refresh operator $\sqcup^U_\theta$ is an outerjoin-refresh operator. Let $\theta = (\equiv_G \wedge p, FALSE)$, for some predicate p and a set of attributes G common to $E_1$ and $E_1$. The following equation shows how to propagate the outerjoin-change table $E_1$ to V under the condition Attrs(J) $\subset$ G.

$V = (E_1 \bowtie_J E_2)$
$V = ((E_1 \sqcup^U_\theta E_1) \bowtie_J E_2) = E_1 \bowtie_J E_2) \sqcup^U_\theta (V)$ where $\theta_1 = (\equiv_{Attrs(E_2)} \wedge ((p \wedge \equiv_G) \vee (\overset{\vee}{E}_{e_1 \in Attrs(E_1)} LHS.e_1 = NULL)), FALSE),$ $U_1 = <(A_1, f), (A_2, f), \ldots, (A_k, f)>$, and $\{A_1, A_2, \ldots, A_k\} = Attrs(E_1)$.

The function $f$ is such that $f(x, y) = y$ for all x, y. Note that the refresh operator used in the equation (7b) to refresh V using V is an outerjoin-refresh as well.

THEOREM 3

Assume that the refresh operator used in the expression of the third column in Table 3 is an outerjoin-refresh operator. Then, the change propagation equations given in Table 3, with the following two changes, correctly propagate outerjoin-change tables.

The refresh equation for selection view is correct even without the condition given in column 6.

The above equation (7b) is used for propagation through an outerjoin operator.

Also, the refresh operator derived in each of the refresh equations (column 4) is also an outerjoin-refresh operator.

EXAMPLE 4

Consider a view $V = \pi_{A,B,F=sum(D),H=sum(E),Num=Count(*)}((\sigma_{A<5}((R \bowtie^{lo}_{JC=D} S) \bowtie T))$, where $R(A, B, C)$, $S(D, E)$, and $T(A, B, L)$ are base relations, and $\bowtie$ is the natural join operation, i.e., a join with the join condition ($\equiv_{\{A,B\}}$). Recall that for the purposes of calculating the SUM aggregates, the attribute value of NULL is taken as 0, provided at least one tuple has a non-NULL value.

For clarity of presentation, let us assume $V_1 = R \bowtie^{lo}_{JC=D} S$, $V_2 = V_1 \bowtie T$, $V_3 = \sigma_{A>5}(V_2)$. Let us define a predicate p as ((LHS.D=NULL)$\wedge$ (LHS.E=NULL)), a predicate q as ((LHS.Num+RHS.Num)=0), an update list $U_1$ as $<(F, f),(H, f)>$, and U as $<(D, g),(E, g),(Num, g)>$. Here, $f(x, y) = y$ for all x, y and $g(x, y) = x+y$ for all x, $y \neq$ NULL and g(NULL, y) = y. The techniques of maintaining views involving outer-join operators by deriving maintenance expressions for V in response to insertions, $\nabla S$, into S, are illustrated.

$V_1 = (R \bowtie^{lo}_{C=D} \nabla S)$ $V_1 = V_1 \sqcup^U_{\theta_1} V_1$, where $\theta_1$ is ($\equiv_{Attrs(R)} \wedge p$ FALSE)  [From Theorem 2]

$V_2 = V_1 \bowtie T$ $V_2 = V_2 \sqcup^U_{\theta_2} V_2$, where $\theta_2$ is ($\equiv_{Attrs(R) \cup Attrs(T)} \wedge p$, FALSE)  [From (4) in Table 3]

$V_3 \sigma_{A>5}(V_2)$ $V_3 = V_3 \sqcup^U_{\theta_3} V_3$  [From (1) in Table 3]

$V = \pi_{A,B,F=Sum(D),H=Sum(E),Num=Count(*)}(V_3)$ $V = V \sqcup^U_\theta V$, where $\theta$ is ($\equiv_{\{A,B\}} \wedge \neg q$, $\equiv_{\{A,B\}} \wedge q$)[From (4) in Table 3]

APPENDIX A: REFRESH ALGORITHM

Algorithm 1: Refresh Algorithm

Input
   Table $V(A_1, A_2, \ldots, A_n)$.
   Change Table $V(A_1, A_2, \ldots, A_n)$.
   $\theta = (\Im_1, \Im_2)$, $U = <(A_{i_1}, f_1), (A_{i_2}, f_2), \ldots, (A_{i_k}, f_k)>$
Output
   Refreshed table V, i.e., $V \sqcup^U_\theta V$.
Method
   DECLARE cursor box_CURSOR FOR
     SELECT $A_1, A_2, \ldots, A_n$ FROM V;
   OPEN cursor_box;
   LOOP
     FETCH cursor_box INTO :$a_1$, :$a_2$, …, :$a_n$;
     UNTIL not-found
       DECLARE cursor_view CURSOR FOR
         SELECT $A_1, A_2, \ldots, A_n$ FROM V
         WHERE ($\Im_1(A_1, A_2, \ldots, A_n, :a_1, :a_2, \ldots, :a_n)$
         OR $\Im_2(A_1, \ldots, A_n,$
           :$a_1, \ldots, :a_n$)) AND (NOT changed);
       OPEN cursor_view;
       LOOP
         FETCH cursor_view INTO :$a_1$ :$a_2$, …, :$a_n$;
         UNTIL not-found
         IF not-found
           INSERT INTO VVALUES (:$a_1$, :$a_2$, …, :$a_n$);
         ELSE-IF $\Im_2$(:$a_1$, :$a_2$, …, :$a_n$,:$a_1$, :$a_2$, …, :$a_n$)
           DELETE FROM V WHERE CURRENT OF cursor_view;
           break;
         ELSE
           UPDATE V SET update attributes=function of update attributes from cursor_view as changed.
           break;
         ENDIF
       ENDLOOP
       CLOSE cursor_view;
   ENDLOOP
   CLOSE cursor_box;

APPENDIX B: PROOF OF THEOREMS

C.1 Proof of Theorem 1

Proof:

Selection: $V = \sigma_p(E)$. First, it is shown that if $e \in E$ affects a tuple $v \in \sigma_p(E) \subset E$ by updating or deleting v from R, then $e \in \sigma_p(E)$. As e results in an update or deletion of v, the pair (es, e) satisfies the join condition ($\equiv_G$). Now, as Attrs(p) $\subset$ G. if es satisfies p then e satisfies p too. Thus, all tuples in E that can update or delete a tuple in $V = \sigma_p(E)$ are in $\sigma_p(E) = V$. Therefore, all the required updates or deletions to V are captured by the refresh equation.

Let I be the set of tuples in E that do not find a match in E.I is the set of tuples inserted into E and thus, $\sigma_p(I)$ should be inserted into V. As $\sigma_p(I) \subset \sigma_p(E) = V$, and as no tuple in $\sigma_p(I)$ will find a match in $V \subset E$, $\sigma_p(I)$ will be inserted into V using the refresh equation of V. Therefore, refresh equation doesn't miss any legitimate insertions into V.

Also, a tuple $v \in \sigma_p(E)$ cannot find a mach in $\sigma_{\bar{p}} E_1$ because Attrs(p) $\subset$ G. Therefore, if v doesn't find a match in $V = \sigma_p(E)$, then v does not find a match in E. Hence, all insertions into V due to the refresh equation are legitimate.

Projection: $V = \Pi_A(E)$. If Attrs($\theta$) $\subset$ A, then the information needed to decide the effect of a tuple $e \in E$ on a tuple $e \in E$, if any, is available in $\Pi_A$(s). Hence, E can be directly applied to $V = \Pi_A(E)$ after the same projection step. Note that the resulting refresh operator is also an aggregate-refresh operator.

Cross Product: $V = E_1 \times E_2$. Suppose a tuple $e_1 \in E_1$ matches with a tuple $e_1 \in E_1$. Consider the set $E_1^{[]e_1} = (e_1 \times E_2) \subset V$. It is easy to see that each tuple $(e_1, e_2) \in E_2^{[]e_1}$ will result in a match with a tuple $(e_1, e_2) \in (e_1 \times E_2)$ due to the join conditions in $\theta_1$. The matches will result in appropriate updates and deletions.

Also any unmatched tuple $e_1 \in E_1$ will also result in the unmatched tuples in $(e_1 \times E_2) \subset V$.

Join: $V = E_1 \bowtie_j E_2$. Follows from the previous cases, but stated in the table for convenience.

Union: $V = E_1 \uplus E_2$. As $((E_1 \uplus E_2) - E_2) = E_1$, the equivalence of the expression is obvious.

Aggregation: $V = \pi_{G', f(A)}(E)$. Without loss of generality, this case is proven when k=1. Let $f_1 = f$ and $A_1 = A$. It is assumed that $(G' \subset G) \wedge A \subset$ Attrs(U), $U = <(A_1, f), (A_2, f), \ldots, (A_k, f)>$ and $f$ is a distributive function. Let us assume that the tuples $e_1, e_2, \ldots e_k \in E$ have the same G' values and their aggregated attribute A values are $a_1$, $a_2, \ldots, a_k$. Also, assume that the tuple $e_i$ matches with a tuple $e_i \in E$ due to $\Im_1$ and that the aggregated attribute A value of $e_i$ is $a_i$. Note that $e_i$'s have the same G' values too. The attribute value $a_i$ of $e_i$ is updated to $f(a_i, a_i)$ due to U. Thus the aggregated value in V derived from $e_i, \ldots, e_k$ should change from $f(a_1, a_2, \ldots, a_n)$ to $f(f(a_1, a_1), f(a_2, a_2), \ldots, f(a_n, a_n))$. Now, by the definition of V, the tuples $e_1, \ldots, e_k \in E$ will be grouped to yield the aggregate attribute value $f(a_1, \ldots, a_n)$. The refresh equation of V correctly changes the aggregated value of the grouped value of $e_i$s from $f(a_1, a_2, \ldots a_n)$ to $f(f(a_1, a_2, \ldots a_n), f(a_1, \ldots, a_n))$. As $f$ is a distributive function, $f(f(a_1, a_1), f(a_2, a_2), \ldots f(a_n, a_n)) = f(f(a_1, a_2, \ldots, a_n), f(a_1, \ldots, a_n))$, hence the refresh equation of V correctly updates the aggregated attribute values in V.

All insertions into E due to E will be converted to aggregated insertions or updates into V by the refresh equation. The deletions from E need not necessarily result in any deletions from V. A tuple is deleted from V only if its aggregated attributes become zero, which is independent of the deletions of the deriving tuples from E.

Outerjoin: $V = E \bowtie_J E_2$. Suppose $E_1$ induces a set of insertions I into the relation $E_1$. Each tuple $i \in I$ results in a set of tuples $E_2^i = i \bowtie_J E_2$ in V. No tuple $e_2^i \in E_2^i$ finds a match in V due to the predicate $(\equiv_G \wedge \equiv_\tau)$, because if it did, i would have found a match in $E_1$ due to $\equiv_G$. Therefore, the refresh equation results in $E_2^i$ being inserted into V for each $i \in I$.

Let us assume that $M(\subset E_1)$ is a set of tuples that find a match in $E_1$ due to $\equiv_G$ and hence, result in either deletion or update of a tuple in $E_1$. Each tuple $m \in M$ results in a set of tuples $E_2^m = m \bowtie_J E_2$ in V. If m matched with a tuple $e_2 \in E_2$ due to both having the same G attributes, then each tuple $(r, m) \in E_1^m$ would match the corresponding tuple $(r, s) \in E_1^s = E_1 \bowtie_J S$. The tuple $(r, s)$ exists in $E_1 \bowtie_J s$ because $(r, m) \in E_1^m$ and $Attrs(J) \subset G$. Also, note that $E_2^s \subset V$. Thus the refresh equation of V affects the updates and deletions correctly.

This completes the proof.

C.2 Proof of Theorem 2

Proof: Due to insertion of $\Delta R$ into R, the view V should change as follows. The set of tuples $\Delta R \bowtie_J S$ should be inserted into V but the tuples of the kind (NULL, ..., NULL, $s_1, s_2, \ldots, s_m$) $\in$ V should be deleted from V if a corresponding tuple $(r_1, r_2, \ldots r_n, s_1, s_2, \ldots, s_m)$ is being inserted into V from V.

The above effect an be achieved by changing a tuple $v = (NULL, \ldots, NULL, s_1, s_2, s_m)$ in V to $v = (r_1, r_2, \ldots, r_n, s_1, s_2, \ldots, s_m)$ if such a tuple v exists in V. The refresh of V would be complete if the tuples v in V for which no such match occurs are inserted into V. By the definition of the refresh operator and its specification, one can see that is exactly what is achieved by the expression $V \bigsqcup_\theta^U V$.

C.3 Proof of Theorem 3

Proof. The proof is the same as in Theorem 1 except for the cases of selection and outerjoin, which uses a different equation.

$V = \sigma_p(E)$. The second characteristic of the outerjoin-refresh operator is used to show that $\sigma_p(E \bigsqcup_\theta^U E) = \sigma_p(E)$.

Using the same arguments as in Theorem 1, the refresh equation of V doesn't miss any legitimate insertions into V affected by the refresh operation $E \bigsqcup_\theta^U E$.

Now it is shown that all insertions into V using the refresh equation are legitimate. The refresh equation may induce an insertion of the tuple $v \in V$ into V if v doesn't find a match in V. If $v \in I$, where I is the set of tuples in E that don't find a match in E, then the insertion is obviously legitimate. Suppose, $v \notin I$. That implies that $v \in E$ found a match with a tuple $e \in E$. Because of the second characteristic of an outerjoin-refresh operator and its specification, any match results in the tuple in E being updated to the matching tuple in E. Thus, the effect of the refresh operation $E \bigsqcup_\theta^U E$ is that the tuple e is updated to v. As $v \in V$, it satisfies the selection condition p and hence, v is included in V. Thus, the insertion of v into V by the refresh equation is correct.

In the refresh equation, if a tuple $v \in V$ is updated due to a tuple $v \in V = \sigma_p(E)$, then $v \in E$ would have been updated by v too in the refresh operation of E. As v is updated to v which satisfied the predicate p, the updated tuple v is correctly retained in V by the refresh equation. This shows that the updates to V in the refresh equation are legitimate.

The only updates the refresh equation might miss are of the kind where a tuple $e \in E$ matches with a tuple $e' \in \tau_{\bar{p}}(E)$. In such a case, the tuple e' is updated to e. If $e \in \sigma_p(E)$, then the updated tuple e should be included in V. This happens in the refresh equation too, as e doesn't find a match in V and hence is inserted into V.

Outerjoin: $V = E_1 \bowtie_J E_2$. The correctness of the refresh equation is proven. Let $M(\subset E_1)$ be the set of tuples in $E_1$ that find a match in $E_1$ due to $\Im_1 = \equiv_G \wedge p$. Note that G is a set of attributes in $E_1$ and p is a predicate over the rest of the attributes in $E_1$. Consider $m \in M$ and that m finds a match $e_1 \in E_1$ due to $\Im_1$. Each m results in the set of tuples $E_2^m = m \bowtie_J E_2$ in $V = E \bowtie_J E_2$. Each tuple $e_2^m = <m, e_2> \in E_2^m$ will find a corresponding match in $v = <e_1, e_2> \in V$ due to the join condition $\equiv_{Attrs(E2) \cup G} \wedge p$. Note that as $Attrs(J) \subset G$. the existence of tuple $<m, e_2>$ in $E_2^m$ implies the existence of v in V. The tuple $<e_1, e_2>$ gets updated to $<m, e_2>$ due to the list $U_1$ in the refresh equation of V. This update affected by the refresh equation is correct because m changes $e_1$ to m too, as $Attrs(G) \cup Attrs(U) = Attrs(E_1)$ and m and $e_1$ have the same G attributes. Thus, all the updates into $E_1$ are correctly propagated to V.

The refresh equation of V results in more updates in V. Let $I \subset E_1$ be the set of tuples in $E_1$ that are inserted into $E_1$ (because they didn't find a $\Im_1$ in $E_1$). Consider $i \in I$. Each i results in the set of tuples $E_2^i = i \bowtie_J E_2$ in V. Tuple $<i, e_2> \in E_2^i$ could only find a match $v \in V$ due to the join condition $\equiv_{Attrs(E_2)} \wedge (\tilde{E}_{e \in Attrs(E_1)} LHS.e = NULL)$, in which case the tuple v is correctly updated to $<i, e_2>$. All the unmatched tuples in V are correctly inserted into V.

APPENDIX C: PROPAGATION OF DELETIONS THROUGH OUTERJOIN OPERATORS

The changes in $V = R \bowtie_J S$ due to deletions from a base relation R cannot be summarized in an outerjoin-change table within our restricted definition of refresh operator. In this section, it is shown that deletions can be propagated from a base table through a outerjoin operator by keeping a count of duplicate tuples in one of the base relations and using an extended version of the refresh operator.

Let $S^{set}$ denote the expression $\pi_{Attrs(S), Num = Count(*)}(S)$. In response to deletions $\nabla R$ from R, V, called an OJdeletion-change table, is defined as $\nabla R \bowtie_J S^{set}$. The view V is refreshed using the same refresh equation $V \bigsqcup_\theta^U V$, where $\theta = (\equiv_{Attrs(V)}, \equiv_{Attrs(S)})$ and $U = <(A_1, f), \ldots, (A_n, f)>$, where $f(x, y) = NULL$ for all x, y and $\{A_1, \ldots, A_k\} = Attrs(R)$. The refresh algorithm used to refresh the view Vusing its OJdeletion-change table is shown in Algorithm 2. The propagation equations of Table 3 for propagating aggregate-change tables through an outerjoin operator can be extended by introducing counts, in the manner described above.

Algorithm 2: Refresh Algorithm to Apply an
OJdeletion-Change Table to its View

Input
   View $V(A_1, \ldots, A_n, B_1, \ldots, B_m)$
   Change Table $V(A_1, \ldots, A_n, B_1, \ldots, B_m, \text{Num})$
   $\theta=(\mathfrak{I}_1, \mathfrak{I}_2)$, $U=<(A_1, f_1), (A_2, f_2), \ldots, (A_k, f_n)>$
Output
   Refresh table V, i.e., $V \sqcup_\theta^U V$.

Procedure
BEGIN
   for each tuple $v=(r, s, l)$ in V
     Let $\{v_1, \ldots, V_t\}$ be the tuples in V that match
       v due to the join condition $\mathfrak{I}_1$.
     if there is a tuple $v' \in V$ such that $v' \notin \{v_1, \ldots, v_1\}$ and
       v' matches with v due to the join condition $\mathfrak{I}_2$
     then
       Delete tuples $v_1, v_2, \ldots, v_1$ from V;
     else
       Update each tuple $v_1, v_2, \ldots, v_I$ in V using the
       specifications in U;
     endif
   endfor
   RETURN V
END Note that the refresh operator doesn't need to query the sources and hence, can be executed very efficiently. Change propagation equations required for propagating an OJdeletion-change table through rational and aggregate operations can be appropriately defined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of incrementally maintaining a database consisting of at least one materialized view in a general view expression tree involving: selection, projection, join, aggregate and outerjoin operators in an arbitrary manner at various levels in the tree based on at least one base table, comprising the steps of:

receiving changes to the base table;

generating a first level change table at a first complex operator including at least one of aggregate or outerjoin in the expression tree based on the received changes;

propagating the generated first level change table through various operators including at least one of selection, projection, join, aggregate or outerjoin to sequentially compute higher-level change tables in the expression tree resulting in a change table at the highest level in the expression tree for the materialized view; and updating the materialized view by applying the change table at the highest level for the materialized view using a refresh operation.

2. The method of claim 1, wherein the change table at the highest level for the materialized view comprises a plurality of tuples representing the changes, the materialized view comprises a plurality of tuples, the refresh operation has three parameters, two join conditions and an update function specification, and the step of updating the materialized view comprises the steps of:

for each tuple in the change table, finding all tuples in the materialized view that match the tuple in the change table, using the join condition; and updating each found tuple in the materialized view by performing operations indicated by the update function specification, if the match is due to the first join condition; and deleting each found tuple in the materialized view if the match is due to the second join condition.

3. The method of claim 2, wherein if the first-level change table is computed at an aggregate operator, then the step of finding all tuples in the materialized view at level that match the tuple in the change table, comprises the step of:

matching "join" attributes of a tuple in the change table with the same attributes of a tuple in the view; and updating some attributes other than the "join" attributes of the tuple in the view using the same attributes of the tuple in the change table.

4. The method of claim 3, wherein the step of updating the materialized view further comprises the steps of:

inserting a tuple from the change table into the materialized view, if no tuples are found in the materialized view that match the tuple from the change table; and deleting a tuple from the materialized view, if an aggregated attribute representing a count of the number of tuples in a group represented by the tuple becomes zero.

5. The method of claim 2, wherein the materialized view, based on at least one table is such that the first-level change table was computed at an outerjoin operator, there is a tuple in the materialized view corresponding to each value of at least one selected attribute in any of the plurality of tables, each tuple in the materialized view comprises the at least one selected attribute and at least one other attribute, the step of finding all tuples in the materialized view that match the tuple in the change table, using the join condition, comprises the step of:

matching the at least one selected attribute of a tuple in the change table with the at least one selected attribute of a tuple in the materialized view; and the step of updating each found tuple in the materialized view comprises the steps of:

updating the at least one other attribute of the tuple in the view using the at least one other attribute of the tuple in the highest-level change table.

6. The method of claim 5, wherein the step of updating the materialized view further comprises the step of:

inserting a tuple from the change table into the materialized view, if no tuples are found in the materialized view that match the tuple from the change table.

7. A system for incrementally maintaining a database consisting of at least one materialized view in a general view expression tree involving: selection, projection, join, aggregate and outerjoin operators in an arbitrary manner at various levels in the tree, based on at least one base table, comprising:

means for receiving changes to the base table;

means for generating a first level change table at a first complex operator including one of aggregate or outerjoin in the expression tree based on the received changes;

means for propagating the generated first level change table through various operators including at least one of selection, projection, join, aggregate or outerjoin to sequentially compute higher-level change tables in the expression tree resulting in a change table at the highest level in the expression tree for the materialized view; and means for updating the materialized view by applying the highest-level change table for the materialized view using a refresh operation.

8. The system of claim 7, wherein the highest-level change table comprises a plurality of tuples representing the changes, the materialized view comprises a plurality of tuples, the refresh operation has two parameters, a join condition and an update function specification, and the means for updating the materialized view comprises the steps of:

means for finding all tuples in the materialized view that match the tuple in the highest-level change table, using the join condition, for each tuple in the highest-level change table; and means for updating each found tuple in the materialized view by performing operations indicated by the update function specification.

9. The system of claim 8, wherein if the first-level change table is computed at an aggregate operator, then the step of finding all tuples in the materialized view at level that match the tuple in the change table, comprises the step of:

matching "join" attributes of a tuple in the change table with the same attributes of a tuple in the view; and updating some attributes other than the "join" attributes of the tuple in the view using the same attributes of the tuple in the change table.

10. The system of claim 9, wherein the means for updating the materialized view further comprises:

means for inserting a tuple from the highest-level change table into the materialized view, if no tuples are found in the materialized view that match the tuple from the highest-level change table; and means for deleting a tuple from the materialized view, if an aggregated attribute representing a count of a number of tuples in a group represented by the tuple becomes zero.

11. The system of claim 8, wherein the materialized view based on at least one table is such that the first-level change table was computed at an outerjoin operator, there is a tuple in the materialized view corresponding to each value of at least one selected attribute in any of the plurality of tables, each tuple in the materialized view comprises the at least one selected attribute and at least one other attribute, the means for finding all tuples in the materialized view that match the tuple in the highest-level change table, using the join condition, comprises:

means for matching the at least one selected attribute of a tuple in the highest-level change table with the at least one selected attribute of a tuple in the materialized view; and the means for updating each found tuple in the materialized view comprises:

means for updating the at least one other attribute of the tuple in the view using the at least one other attribute of the tuple in the highest-level change table.

12. The system of claim 11, wherein the means for updating the materialized view further comprises:

means for inserting a tuple from the highest-level change table into the materialized view, if no tuples are found in the materialized view that match the tuple from the highest-level change table; and means for deleting a tuple from the materialized view, if a value of the at least one selected attribute of the tuple is no longer present in any table.

13. A database system comprising:

a processor;

a storage device including a database consisting of at least one materialized view, in a general view expression tree involving complex operators including at least one of selection, projection, join, aggregate or outerjoin in an arbitrary manner at various levels in the tree based on at least one base table; and a refresh engine performing the steps of:

receiving changes to the base table;

generating a first level change table at a first complex operator including at least one of aggregate, or outerjoin in the expression tree based on the received changes;

propagating the generated first level change table through various complex operators including at least one of selection, projection, join, aggregate or outerjoin to sequentially compute higher-level change tables in the expression tree resulting in a change table at the highest-level in the expression tree for the materialized view; and updating the materialized view by applying the highest-level change table for the materialized view using a refresh operation.

14. The system of claim 13, wherein the highest-level change table comprises a plurality of tuples representing the changes, the materialized view comprises a plurality of tuples, the refresh operation has two parameters, a join condition and an update function specification, and the step of updating the materialized view comprises the steps of:

for each tuple in the highest-level change table, finding all tuples in the materialized view that match the tuple in the highest-level change table, using the join condition; and updating each found tuple in the materialized view by performing operations indicated by the update function specification.

15. The system of claim 14, wherein the materialized view is an aggregated materialized view, each tuple in the materialized view and in the highest-level change table includes at least one non-aggregated attribute and at least one aggregated attribute, the step of finding all tuples in the materialized view that match the tuple in the highest-level change table, using the join condition, comprises the step of:

matching the non-aggregated attribute of a tuple in the highest-level change table with the non-aggregated attribute of a tuple in the view and; and the step of updating each found tuple in the materialized view comprises the steps of:

updating the aggregated attribute of the tuple in the view using the aggregated attribute of the tuple in the highest-level change table.

16. The system of claim 15, wherein the step of updating the materialized view further comprises the steps of:

inserting a tuple from the highest-level change table into the materialized view, if no tuples are found in the materialized view that match the tuple from the highest-level change table; and deleting a tuple from the materialized view, if an aggregated attribute representing a count of a number of tuples in a group represented by a tuple becomes zero.

17. The system of claim 14, wherein the materialized view is an outerjoin materialized view based on a plurality of tables, there is a tuple in the materialized view corresponding to each value of at least one selected attribute in any of the plurality of tables, each tuple in the materialized view comprises the at least one selected attribute and at least one other attribute, the step of finding all tuples in the materialized view that match the tuple in the highest-level change table, using the join condition, comprises the step of:

matching the at least one selected attribute of a tuple in the highest-level change table with the at least one selected attribute of a tuple in the view and; and the step of updating each found tuple in the materialized view comprises the steps of:

updating the at least one other attribute of the tuple in the view using the at least one other attribute of the tuple in the highest-level change table.

18. The system of claim 17, wherein the step of updating the materialized view further comprises the steps of:

inserting a tuple from the highest- level change table into the materialized view, if no tuples are found in the materialized view that match the tuple from the highest-level change table; and deleting a tuple from the materialized view, if a value of the at least one selected attribute of the tuple is no longer present in any table.

19. A medium, executable in a computer system, for incrementally maintaining a consisting of at least one materialized view in a general view expression tree involving complex operators including at least one of selection, projection, join, aggregate or outerjoin in an arbitrary manner at various levels in the tree based on at least one base table, the medium comprising:

program instruction receiving changes to the base table;

program instructions generating a first level change table at a first complex operator including at least one aggregate or outerjoin in the expression tree based on the received changes;

program instructions propagating the generated first level change table through various complex operators including at least one of selection, projection, join, aggregate or outerjoin to sequentially compute higher-level change tables in the expression tree resulting in a change table at the highest level in the expression tree for the materialized view; and program instructions updating the materialized view by applying the change table at the highest level for the materialized view using a refresh operation.

20. The medium of claim 19, wherein the change table at the highest level for the materialized view comprises a plurality of tuples representing the changes, the materialized view comprises a plurality of tuples, the refresh operation has three parameters, two join condition and an update function specification, and the step of updating the materialized view for each tuple in the change table, the medium comprises:

for each tuple in the change table, program instructions finding all tuples in the materialized view that match the tuple in the change table, using the join condition; and program instructions updating each found tuple in the materialized view by performing operations indicated by the update function specification, if the match is due to the first join condition; and deleting each found tuple in the materialized view if the match is due to the second join condition.

21. The medium of claim 20, wherein the materialized view if the first-level change table is computed at an aggregate operator, then the step of finding all tuples in the materialized view at level that match the tuple in the change table, comprises:

program instructions matching "join" attributes of a tuple in the change table with the same attributes of a tuple in the view; and program instructions updating some attributes other than the "join" of the tuple in the view using the same attributes of the tuple in the change table.

22. The medium of claim 21, wherein the program instructions updating the materialized view further comprises:

if the first-level change table is computed at an aggregate operator, then the step of finding all tuples in the materialized view at level that match the tuple in the change table, comprises:

program instructions matching "join" attributes of a tuple in the change table with the same attributes of a tuple in the view; and program instructions updating some attributes other than the "join" attributes of the tuple in the view using the same attributes of the tuple in the change table.

23. The medium of claim 20, wherein the materialized view, based on at least one table is such that the first-level change table was computed at an outerjoin operator, there is a tuple in the materialized view corresponding to each value of at least one selected attribute in any of the plurality of tables, each tuple in the materialized view comprises:

the at least one selected attribute and at least one other attribute, program instructions finding all tuples in the materialized view that match the tuple in the change table, using the join condition, comprises:

program instructions matching the at least one selected attribute of a tuple in the change table with the at least one selected attribute of a tuple in the materialized view; and program instructions updating each found tuple in the materialized view comprises:

program instructions updating the at least one other attribute of the tuple in the view using the at least one other attribute of the tuple in the highest-level change table.

24. The medium of claim 23, wherein the program instructions updating the materialized view further comprises:

program instructions inserting a tuple from the change table into the materialized view, if no tuples are found in the materialized view that match the tuple from the change table.

* * * * *